United States Patent
Tsai

(10) Patent No.: US 8,524,089 B2
(45) Date of Patent: Sep. 3, 2013

(54) COMBINED SEDIMENTATION AND PRESSURE FLOATATION WASTEWATER TREATMENT TANK

(76) Inventor: Kuei-Lin Tsai, Taipei County (TW)

(*) Notice: Subject to any disclaimer, the term of this patent is extended or adjusted under 35 U.S.C. 154(b) by 471 days.

(21) Appl. No.: 12/639,066

(22) Filed: Dec. 16, 2009

(65) Prior Publication Data

US 2011/0120927 A1    May 26, 2011

(51) Int. Cl.
*C02F 1/24* (2006.01)
*B01D 21/02* (2006.01)

(52) U.S. Cl.
USPC ........... 210/703; 210/802; 210/803; 210/806; 210/221.1; 210/260; 210/262; 210/521

(58) Field of Classification Search
USPC ............... 210/202, 221.1, 221.2, 259, 261, 210/262, 703, 802, 803, 806, 260, 521
See application file for complete search history.

(56) References Cited

U.S. PATENT DOCUMENTS

| | | | | |
|---|---|---|---|---|
| 2,888,139 | A * | 5/1959 | Fischer | 210/221.2 |
| 4,160,737 | A * | 7/1979 | Pielkenrood | 210/202 |
| 4,184,954 | A * | 1/1980 | Peterson | 210/791 |
| 4,282,256 | A * | 8/1981 | Evich et al. | 426/7 |
| 4,448,681 | A | 5/1984 | Ludke et al. | |
| 5,021,165 | A | 6/1991 | Kalnins | |
| 6,174,435 | B1 * | 1/2001 | Kaltchev | 210/221.2 |
| 6,599,418 | B2 * | 7/2003 | Wang | 210/202 |
| 2008/0006577 | A1 | 1/2008 | Choi et al. | |

FOREIGN PATENT DOCUMENTS

| | | | |
|---|---|---|---|
| JP | 50091950 A | * | 7/1975 |
| JP | 2002086157 A | * | 3/2002 |
| SU | 1237637 A1 | * | 9/1984 |
| SU | 1303556 A1 | * | 4/1987 |
| TW | M265409 | | 5/2005 |
| TW | M324684 | | 1/2008 |
| WO | WO 2005099857 A1 | * | 10/2005 |

* cited by examiner

*Primary Examiner* — Thomas M Lithgow
(74) *Attorney, Agent, or Firm* — Alan Kamrath; Kamrath IP Lawfirm, P.A.

(57) ABSTRACT

A combined sedimentation and pressure floatation wastewater treatment tank includes a tank body, a sedimentation treatment device and a pressure floatation treatment device. The tank body contains a predetermined amount of wastewater for treatment. The sedimentation treatment device is used to remove relatively heavier sludge from the wastewater by sedimentation treatment, and the pressure floatation treatment device is used to remove relatively lighter sludge from the initially treated wastewater by pressure floatation treatment. In operation, the wastewater is initially treated by the sedimentation treatment device and is further treated by the pressure floatation treatment device. Alternatively, the wastewater is initially treated by the pressure floatation treatment device and is further treated by the sedimentation treatment device.

12 Claims, 3 Drawing Sheets

COMBINED SEDIMENTATION AND PRESSURE FLOATATION WASTEWATER TREATMENT TANK

BACKGROUND OF THE INVENTION

1. Field of the Invention

The present invention relates to a combined sedimentation and pressure floatation wastewater treatment tank. More particularly, the present invention relates to a sedimentation arrangement and pressure floatation arrangement incorporated in a single wastewater treatment tank for providing a dual treatment function.

2. Description of the Related Art

In general, wastewater treatment covers several wastewater treatment methods, according to physical properties, for the removal of solid sludge contained in the wastewater. If the sludge is lighter, a pressure floatation method is employed and implemented in a wastewater pressure floatation treatment tank or facilities, for example. If solids and large particles of the sludge are heavier, a sedimentation method is employed and implemented in a wastewater sedimentation treatment tank or facilities, for example. However, both the pressure floatation method and the sedimentation method are well-developed wastewater treatment technologies.

For example, Taiwanese Utility Model Patent No. 324684, entitled "Oil-stock tank for pressure floatation treatment," discloses an oil-stock structure of a pressure floatation tank, and Taiwanese Utility Model Patent No. 265409, entitled "Improved oil-stock tank structure," discloses an improved oil-stock tank structure for pressure floatation treatment. U.S. Pat. No. 5,021,165, entitled "Oil and water separating system with hydrocyclone and floatation device," discloses a pressure floatation method for oil and water separation treatment. U.S. Pat. No. 4,448,681, entitled "Floatation arrangement,"discloses a pressure floatation arrangement. U.S. patent application publication No. 20080006577, entitled "Method and apparatus for wastewater treatment using nitrogen/phosphorous removal process combined with floatation separation of activated sludge," discloses a pressure floatation separation method and an apparatus thereof. Each of the above-mentioned Taiwanese and US patent application publications and issued patents is incorporated herein by reference for purposes including, but not limited to, indicating the background of the present invention and illustrating the state of the art.

As a matter of fact, in wastewater treatment processes, there are grease, organic solvents and other equivalent waste materials contained in the wastewater. In some circumstances, changes of wastewater sludge properties will result in enlarging or shrinking sizes of flocs contained in the wastewater. Simply employing either of the pressure floatation method or the sedimentation method cannot achieve the complete removal of the solid sludge contained in the wastewater. Consequently, a great amount of remnant sludge remaining in the waste water treatment tank will overflow into the environment. Hence, the remnant sludge will affect the quality of the treated wastewater when processing a single treatment selected from the pressure floatation method and the sedimentation method.

As has been discussed above, these patents do not disclose a combined device for incorporating different wastewater treatment methods. However, the single treatment of either the pressure floatation method and the sedimentation method cannot achieve the complete removal of the solid sludge contained in the wastewater. Hence, there is a need of improving the conventional pressure floatation method and the conventional sedimentation method for enhancing the efficiency of removing the solid sludge.

As is described in greater detail below, the present invention provides a combined sedimentation and pressure floatation wastewater treatment tank. A sedimentation arrangement and pressure floatation arrangement incorporated in a single wastewater treatment tank provides a dual treatment function in such a way as to mitigate and overcome the above problem.

SUMMARY OF THE INVENTION

The primary objective of this invention is to provide a combined sedimentation and pressure floatation wastewater treatment tank. A sedimentation arrangement and pressure floatation arrangement incorporated in a single wastewater treatment tank provides a dual treatment function. Accordingly, the wastewater treatment tank is successful in treating wastewater by sedimentation and pressure floatation.

The combined sedimentation and pressure floatation wastewater treatment tank in accordance with an aspect of the present invention includes a tank body, a sedimentation treatment device and a pressure floatation treatment device. The tank body contains a predetermined amount of wastewater for treatment. The sedimentation treatment device is used to remove relatively heavier sludge from the wastewater by sedimentation treatment, and the pressure floatation treatment device is used to remove relatively lighter sludge from the initially treated wastewater by the pressure floatation treatment. In operation, the wastewater is initially treated by the sedimentation treatment device and is further treated by the pressure floatation treatment device. Alternatively, the wastewater is initially treated by the pressure floatation treatment device and is further treated by the sedimentation treatment device.

In a separate aspect of the present invention, the sedimentation treatment device is arranged at a lower portion of the wastewater treatment tank.

In a further separate aspect of the present invention, the sedimentation treatment device includes a plurality of inclined walls.

In a yet further separate aspect of the present invention, the sedimentation treatment device connects with a first sludge scraper machine operated to scrape and discharge sludge sediments from an interior of the wastewater treatment tank.

In a yet further separate aspect of the present invention, the pressure floatation treatment device is arranged at an upper portion of the wastewater treatment tank.

In a yet further separate aspect of the present invention, the pressure floatation treatment device includes an air compressor unit.

In a yet further separate aspect of the present invention, the pressure floatation treatment device further includes a second sludge scraper machine operated to scrape and discharge floated sludge from the interior of the wastewater treatment tank.

In a yet further separate aspect of the present invention, the pressure floatation treatment device further includes an additional sedimentation treatment unit.

In a yet further separate aspect of the present invention, the additional sedimentation treatment unit connects with a side of the pressure floatation treatment device.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a combined sedimentation and pressure floatation wastewater treatment tank in accordance with the preferred embodiment of the present invention can be applicable to a wide variety of wastewater treatment systems or the like. By way of example, the combined sedimentation and pressure floatation wastewater treatment tank may incorporate with a single sedimentation treatment tank or a single pressure floatation treatment tank.

Figure 1:
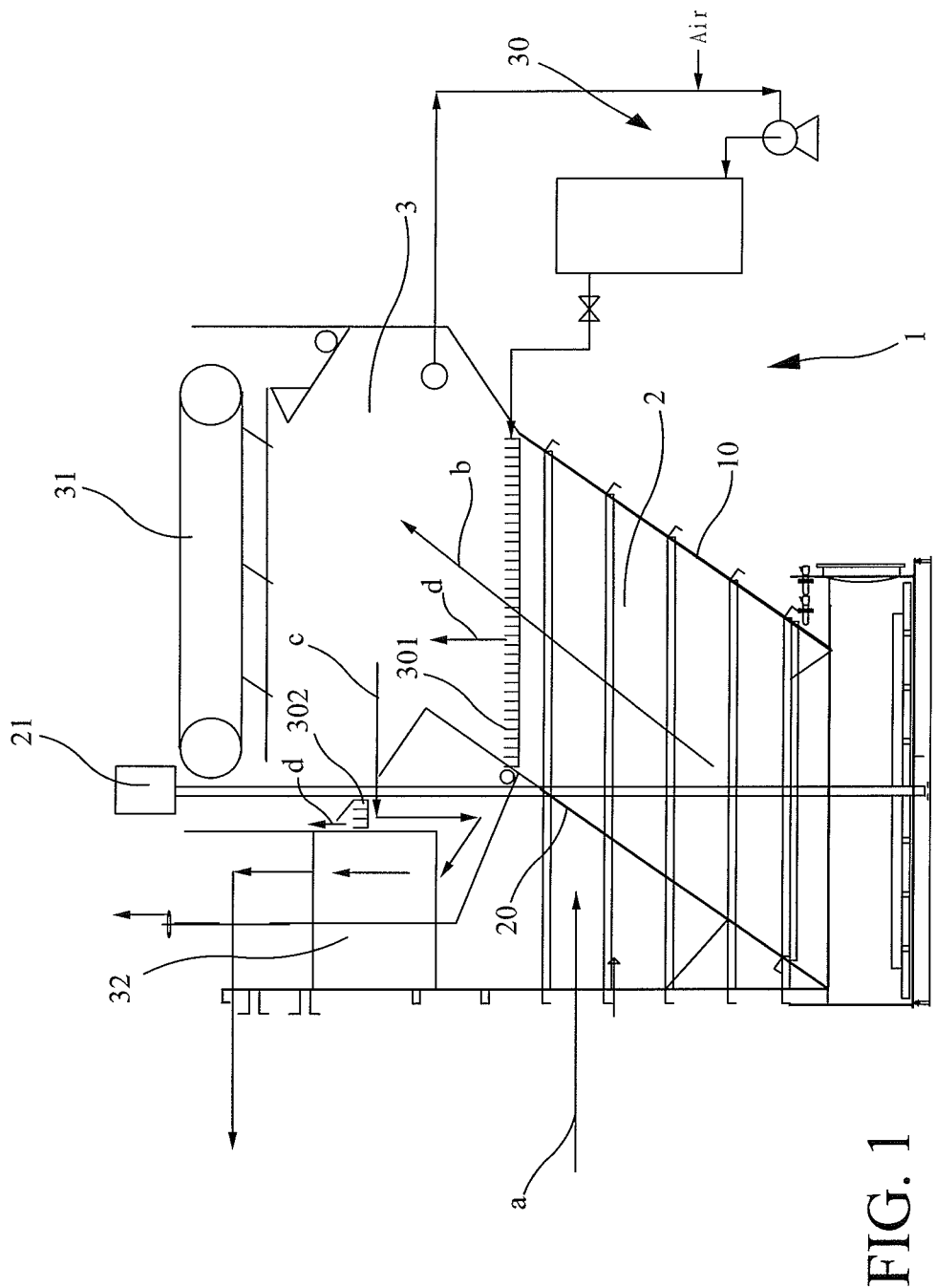
FIG. 1 is a structurally schematic view of a combined sedimentation and pressure floatation wastewater treatment tank in accordance with a first preferred embodiment of the present invention.

FIG. 1 shows a structurally schematic view of a combined sedimentation and pressure floatation wastewater treatment tank in accordance with a first preferred embodiment of the present invention. With continued reference to FIG. 1, the combined sedimentation and pressure floatation wastewater treatment tank 1 in accordance with the preferred embodiment of the present invention includes a tank body 10, a sedimentation treatment device 2 and a pressure floatation treatment device 3. The combined sedimentation and pressure floatation wastewater treatment tank 1 is capable of providing functions of first sedimentation treatment and second pressure floatation treatment, or providing functions of first pressure floatation treatment and second sedimentation treatment, as will be discussed in greater detail subsequently.

Still referring to FIG. 1, the tank body 10 of the first preferred embodiment may have any shape or size desired, but it must permit accommodating the sedimentation treatment device 2 and the pressure floatation treatment device 3. The tank body 10 is formed to incorporate the sedimentation treatment device 2 with the pressure floatation treatment device 3 such that the wastewater treatment tank 1 can provide dual function of sedimentation and pressure floatation treatment, or pressure floatation and sedimentation treatment. In a preferred embodiment, the tank body 10 is formed from a single tank body which is not limitative of the present invention.

Still referring to FIG. 1, the tank body 10 of the first preferred embodiment is formed with at least one wastewater inlet (not labeled), at least one treated water outlet (not labeled) and at least one sludge outlet (not labeled) which are formed from known structures in the art. The constructions of the wastewater inlet, the treated water outlet and the sludge outlet have known configuration, and the detailed descriptions may be omitted. The number and positions of the wastewater inlet, the treated water outlet and the sludge outlet are arranged according to design needs.

Referring again to FIG. 1, untreated wastewater flows into the tank body 10 via the wastewater inlet (as best shown in the direction indicated by arrow "a" in FIG. 1) and circulates in the tank body 10. The sedimentation treatment device 2 and the pressure floatation treatment device 3 are equipped in the tank body 10 to treat the wastewater, and the treated water is discharged from the treated water outlet. Furthermore, sludge removed from the wastewater is discharged from the sludge outlet.

With continued reference to FIG. 1, in the first preferred embodiment, the sedimentation treatment device 2 is arranged at a lower portion of wastewater treatment tank 1 which is not limitative of the present invention. The sedimentation treatment device 2 includes a plurality of inclined walls 20 formed with a predetermined angle, and is used to remove relatively heavier sludge from the wastewater by sedimentation treatment with the inclined walls 20. In the sedimentation treatment device 2 the wastewater may flow upward along the inclined walls 20, as best shown in the direction indicated by arrow "b" in FIG. 1, and the relatively heavier sludge will slow down. Meanwhile, the sedimentation of the heavier sludge occurs and accumulates on the inclined walls 20 such that the sludge sediment will flow down along the inclined walls 20.

Still referring to FIG. 1, the sedimentation treatment device 2 further includes a first sludge scraper machine 21 arranged at a bottom of the wastewater treatment tank 1. The sedimentation treatment device 2 connects with the first sludge scraper machine 21 operated to scrape and discharge the sludge sediments from an interior of the wastewater treatment tank 1 via the sludge outlet, which can be achieved in the known manner so that the detailed descriptions may be omitted.

Still referring to FIG. 1, the wastewater still remains with relatively lighter sludge, impurities or grease even though the relatively heavier sludge has been removed by sedimentation treatment. Subsequently, the initially treated wastewater is guided to the pressure floatation treatment device 3, as best shown in the direction indicated by arrow "b" in FIG. 1, for further removing the lighter sludge, impurities and grease from the initially treated wastewater.

Still referring to FIG. 1, in the first preferred embodiment, the pressure floatation treatment device 3 is arranged at an upper portion of wastewater treatment tank 1 which is not limitative of the present invention. The pressure floatation treatment device 3 is used to remove lighter sludge, impurities, grease and other remnants from the initially treated wastewater by pressure floatation treatment. In operation, the lighter sludge, impurities, grease and other remnants will float on the wastewater of the wastewater treatment tank 1.

With continued reference to FIG. 1, the pressure floatation treatment device 3 includes an air compressor unit 30, a first pressurized water sprayer 301 and a second pressurized water sprayer 302. The first pressurized water sprayer 301 and the second pressurized water sprayer 302 are arranged at a bottom portion of the pressure floatation treatment device 3. The air compressor unit 30 is used to mix compressed air with water, and to add the pressurized water into the wastewater by spraying or jetting the pressurized water, as best shown in the direction indicated by arrows "d" in FIG. 1. The pressurized water can bring the lighter sludge, impurities and grease to the upper portion of the pressure floatation treatment device 3 and to float on the wastewater. Finally, the completely treated water is discharged from the pressure floatation treatment device 3, as best shown in the direction indicated by a series of arrows "c" in FIG. 1.

Referring again to FIG. 1, in the first preferred embodiment, the pressure floatation treatment device 3 further includes a second sludge scraper machine 31 arranged at the top portion of the pressure floatation treatment device 3. The pressure floatation treatment device 3 operated to scrape and discharge floated sludge from the interior of the wastewater treatment tank 1. Finally, the floated sludge will be discharged from the pressure floatation treatment device 3 via the sludge outlet.

Still referring to FIG. 1, in the first preferred embodiment, the pressure floatation treatment device 3 further includes an additional sedimentation treatment unit 32 which connects with a side of the pressure floatation treatment device 3. The secondly treated wastewater is guided from the pressure floatation treatment device 3 to the additional sedimentation treatment unit 32, as best shown in the direction indicated by a series of arrows "c" in FIG. 1. Finally, the completely treated wastewater will be discharged from the pressure floatation treatment device 3 via the treated water outlet to exterior.

Figure 2:
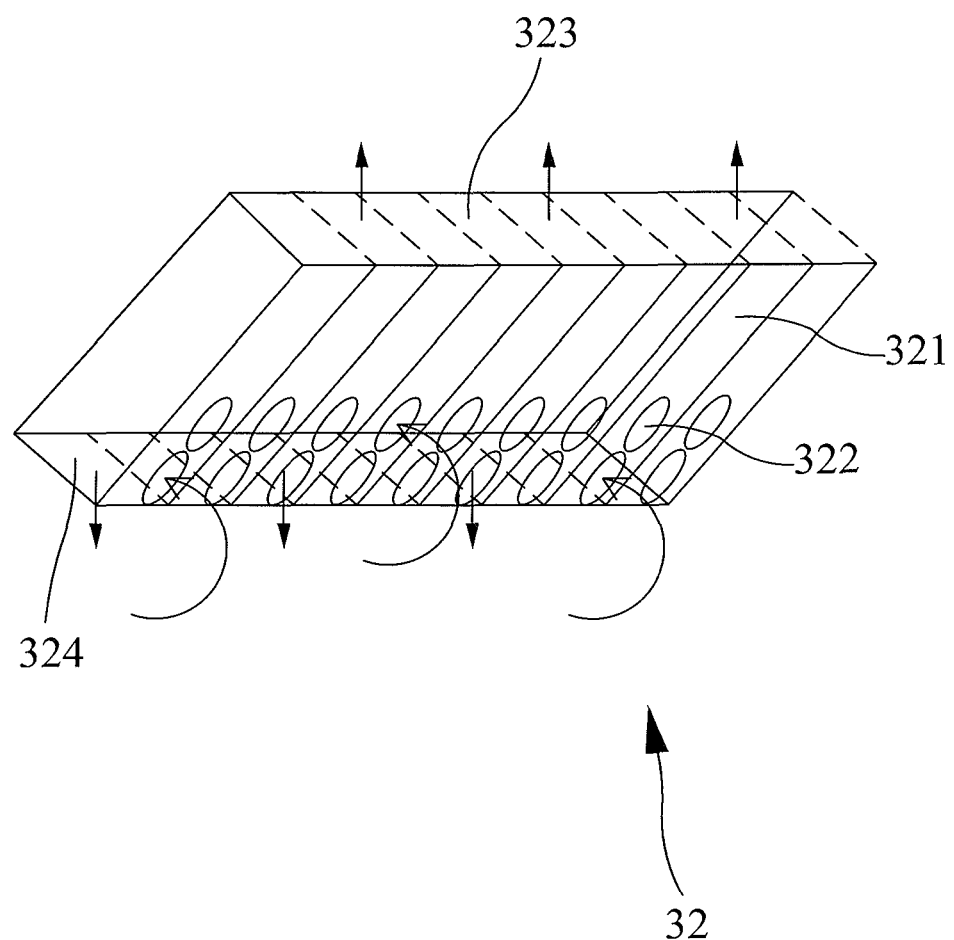
FIG. 2 is a perspective schematic view of an additional sedimentation treatment unit applied in the combined sedimentation and pressure floatation wastewater treatment tank in accordance with the first preferred embodiment of the present invention, depicted in FIG. 1.

FIG. 2 shows a perspective schematic view of the additional sedimentation treatment unit applied in the combined sedimentation and pressure floatation wastewater treatment tank in accordance with the first preferred embodiment of the present invention. Referring to FIG. 2, the additional sedimentation treatment unit 32 includes a plurality of inclined walls 321, wastewater inlets 322, treated water outlets 323 and sludge outlets 324 which is not limitative of the present invention.

Referring again to FIGS. 1 and 2, the sedimentation treatment unit 32 is used to further remove the relatively heavier remnant sludge remaining in the secondly treated wastewater discharged from the pressure floatation treatment device 3, as best shown in the directions indicated by curved arrows in FIG. 2. The wastewater may flow upward along the inclined walls 321, and the relatively heavier remnant sludge will slow down. Meanwhile, the sedimentation of the heavier remnant sludge occurs and accumulates on the inclined walls 321 such that the remnant sludge sediment will flow down along the inclined walls 321 to achieve the sedimentation treatment. The completely treated water can be discharged from the treated water outlets 323, as best shown in the directions indicated by upward arrows in FIG. 2. Correspondingly, the remnant sludge sediments can be discharged from the sludge outlets 324, as best shown in the directions indicated by downward arrows in FIG. 2, to the exterior.

Still referring to FIGS. 1 and 2, the treated water can be discharged from the sedimentation treatment unit 32 to the exterior, as best shown the direction indicated by a series of arrows "c" in FIG. 1. Finally, the remnant sludge sediments can be discharged from the interior of the wastewater treatment tank 1 via the sludge outlet, which can be achieved in the known manner so that the detailed descriptions may be omitted.

With continued reference to FIGS. 1 and 2, in the wastewater treatment tank 1 in accordance with the first preferred embodiment of the present invention, the wastewater is firstly treated in the sedimentation treatment device 2, and the treated wastewater is further treated in the pressure floatation treatment device 3 to provide a dual treatment function of wastewater treatment.

Figure 3:
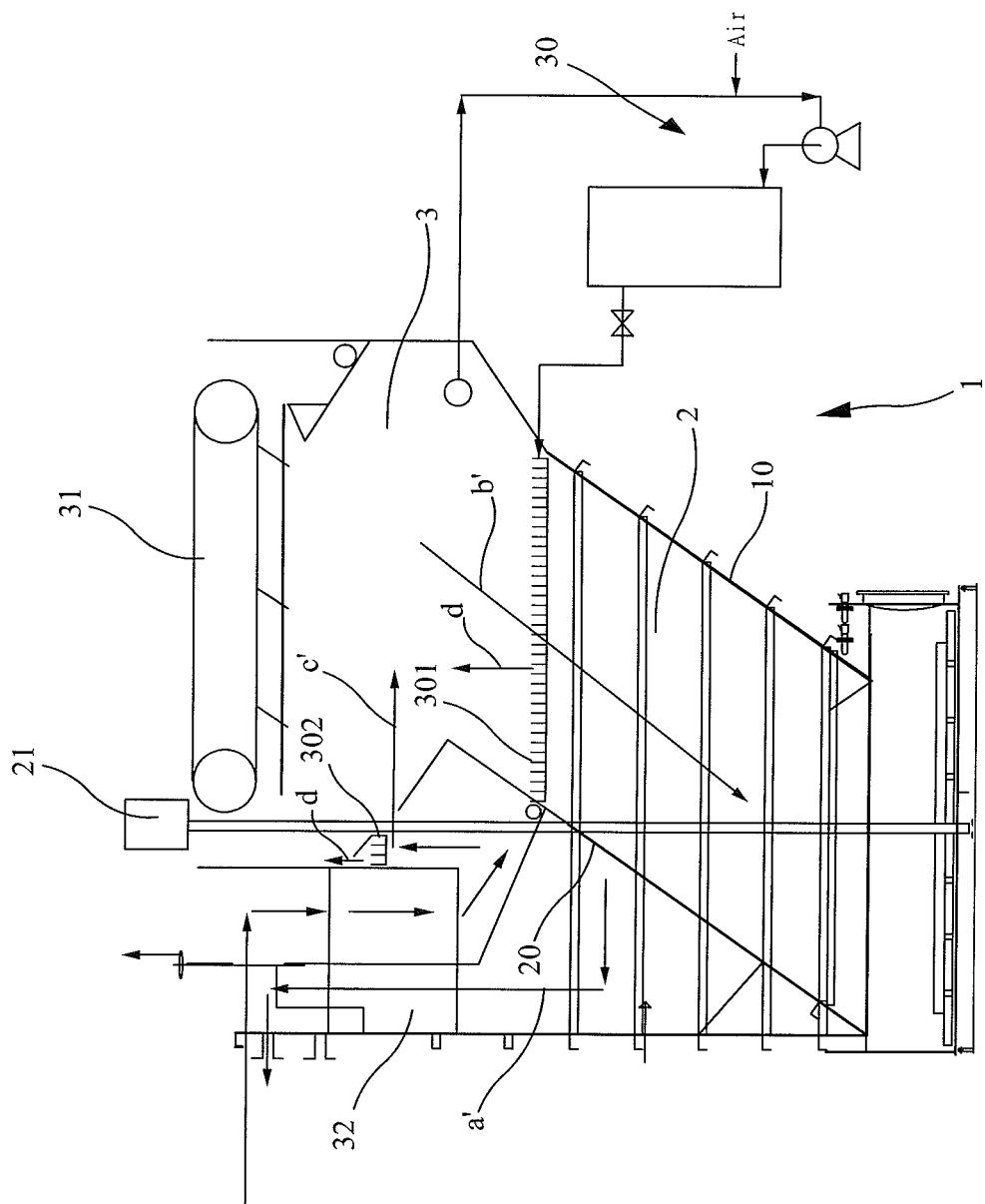
FIG. 3 is a structurally schematic view, similar to FIG. 1, of the combined sedimentation and pressure floatation wastewater treatment tank operated in a reverse direction of wastewater treatment in accordance with a second preferred embodiment of the present invention.

FIG. 3 shows a structurally schematic view of the combined sedimentation and pressure floatation wastewater treatment tank operated in a reverse direction of wastewater treatment in accordance with a second preferred embodiment of the present invention. Reference numerals of the second embodiment of the present invention have applied the identical numerals of the first embodiment, as best shown in FIG. 1. The construction of the wastewater treatment tank in accordance with the second embodiment has similar configuration and same function as those of the first embodiment so that the detailed descriptions may be omitted.

Referring to FIG. 3, in comparison with the first embodiment, the wastewater treatment tank 1 in accordance with the second preferred embodiment of the present invention is operated in a reverse treatment process. In operation, untreated wastewater flows into the tank body 10 via the wastewater inlet. Firstly, the untreated wastewater passes through the sedimentation treatment unit 32 (as best shown in the direction indicated by a series of arrows c' in FIG. 3) for preliminary sedimentation treatment. Secondly, the wastewater flows to the pressure floatation treatment device 3 (as best shown in the direction indicated by a series of arrows c' in FIG. 3) for pressure floatation treatment by pressurized water, as best shown in the direction indicated by arrows d in FIG. 3. Thirdly, the wastewater flows downward to the sedimentation treatment device 2 (as best shown in the direction indicated by arrows b' in FIG. 3) for sedimentation treatment. Finally, the completely treated water is discharged from the sedimentation treatment device 2 via the treated water outlet, as best shown in the direction indicated by a series of arrows a' in FIG. 3, to the exterior.

With continued reference to FIG. 3, in the wastewater treatment tank 1 in accordance with the second preferred embodiment of the present invention, the wastewater is firstly treated in the pressure floatation treatment device 3, and is further treated in the sedimentation treatment device 2 to provide a dual treatment function of wastewater treatment.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A combined sedimentation and pressure floatation wastewater treatment apparatus, comprising:
   a tank body containing wastewater;
   a sedimentation treatment device including a plurality of inclined walls and operated to remove relatively heavier sludge from the wastewater by means of sedimentation treatment, with the sedimentation treatment device arranged at a lower portion of the tank body;
   a pressure floatation treatment device operated to remove relatively lighter sludge from the wastewater by pressure floatation treatment, with the pressure floatation treatment device arranged at an upper portion of the tank body above the inclined walls; and
   means for alternately flowing the wastewater from the lower portion to the upper portion of the tank body to be initially treated by the sedimentation treatment device and the initially-treated wastewater to be further treated by the pressure floatation treatment device above the inclined walls and reversely flowing the wastewater from the upper portion to the lower portion of the tank body to be initially treated by the pressure floatation treatment device and the initially-treated wastewater to be further treated by the sedimentation treatment device below the pressure floatation treatment device.

2. The combined sedimentation and pressure floatation wastewater treatment tank as defined in claim 1, wherein the sedimentation treatment device connects with a first sludge scraper machine operated to scrape sludge sediments.

3. The combined sedimentation and pressure floatation wastewater treatment apparatus as defined in claim 2, wherein the pressure floatation treatment device connects with a second sludge scraper machine operated to scrape sludge sediments.

4. The combined sedimentation and pressure floatation wastewater treatment apparatus as defined in claim 3, wherein the pressure floatation treatment device further includes an additional sedimentation treatment unit.

5. The combined sedimentation and pressure floatation wastewater treatment apparatus as defined in claim 4, wherein the additional sedimentation treatment unit connects with a side of the pressure floatation treatment device.

6. The combined sedimentation and pressure floatation wastewater treatment apparatus as defined in claim 1, wherein the pressure floatation treatment device includes an air compressor unit.

7. The combined sedimentation and pressure floatation wastewater treatment apparatus as defined in claim 1, wherein the pressure floatation treatment device further includes a sludge scraper machine operated to scrape floated sludge.

8. The combined sedimentation and pressure floatation wastewater treatment apparatus as defined in claim 1, wherein the pressure floatation treatment device further includes an additional sedimentation treatment unit.

9. The combined sedimentation and pressure floatation wastewater treatment apparatus as defined in claim 8, wherein the additional sedimentation treatment unit connects with a side of the pressure floatation treatment device.

10. Wastewater treatment method comprising:
flowing wastewater into a tank body into a sedimentation treatment device with inclined walls arranged at a lower portion of the tank body removing relatively heavier sludge from the wastewater by sedimentation treatment and from the sedimentation treatment device into a pressure floatation treatment device arranged at an upper portion of the tank body above the inclined walls removing relatively lighter sludge from the wastewater by pressure floatation and reversing flow of the wastewater into the upper portion of the tank body into the pressure floatation treatment device removing relatively lighter sludge from the wastewater by pressure floatation and from the pressure floatation treatment device into the lower portion of the tank body into the inclined walls of the sedimentation treatment device removing relatively heavier sludge from the wastewater by sedimentation treatment.

11. The wastewater treatment method of claim 10 further comprising:
forming at least one wastewater inlet in the tank body;
wherein flowing wastewater into the tank body into the sedimentation treatment device comprises flowing the wastewater into the at least one wastewater inlet; and
wherein flowing the wastewater from the pressure floatation treatment device into the sedimentation treatment device includes flowing the wastewater out the at least one wastewater inlet.

12. The wastewater treatment method of claim 11 further comprising:
spraying pressured water at a bottom portion of the pressure floatation treatment device and above the inclined walls.

* * * * *